(12) United States Patent
Searles et al.

(10) Patent No.: US 11,983,063 B2
(45) Date of Patent: May 14, 2024

(54) SCALABLE POWER DELIVERY SYSTEM

(71) Applicant: Apple Inc., Cupertino, CA (US)

(72) Inventors: Shawn Searles, Austin, TX (US);
Sanjay Pant, Santa Clara, CA (US);
Ludmil N. Nikolov, Chippenham (GB);
Tiago Filipe Galhoz Patrao, Swindon (GB); Enrico Zanetti, Cascina (IT);
Hao Zhou, San Jose, CA (US);
Vincenzo Bisogno, Swindon (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/823,949

(22) Filed: Aug. 31, 2022

(65) Prior Publication Data
US 2024/0069621 A1 Feb. 29, 2024

(51) Int. Cl.
*G06F 1/32* (2019.01)
*G06F 1/3296* (2019.01)
*H02M 1/00* (2006.01)
*H02M 3/157* (2006.01)

(52) U.S. Cl.
CPC ........ *G06F 1/3296* (2013.01); *H02M 1/0006* (2021.05); *H02M 1/0025* (2021.05); *H02M 1/007* (2021.05); *H02M 3/157* (2013.01)

(58) Field of Classification Search
CPC ... G06F 1/3296; H02M 1/007; H02M 1/0006; H02M 1/0025; H02M 3/157
See application file for complete search history.

(56) References Cited

U.S. PATENT DOCUMENTS

| | | | |
|---|---|---|---|
| 9,247,496 B2 | 1/2016 | Khlat | |
| 9,831,767 B2 | 11/2017 | Suryanarayana et al. | |
| 2014/0223205 A1 | 8/2014 | Muthukaruppan et al. | |
| 2014/0232368 A1 | 8/2014 | Dally | |
| 2016/0018876 A1* | 1/2016 | Strijker | H03K 17/16 713/323 |
| 2019/0058398 A1 | 2/2019 | Sharifi et al. | |
| 2020/0328712 A1* | 10/2020 | Suzuki | H02P 27/06 |

(Continued)

FOREIGN PATENT DOCUMENTS

CN 108646088 A 10/2018

OTHER PUBLICATIONS

"14 channel configurable power management integrated circuit," NXP Semiconductors; Data sheet: Technical Data, Document No. MMPF0100 Rev. 20, May 2022, 137 pages.

(Continued)

*Primary Examiner* — Zahid Choudhury
(74) *Attorney, Agent, or Firm* — Kowert, Hood, Munyon, Rankin & Goetzel, P.C.; Dean M. Munyon

(57) ABSTRACT

A power delivery system included in a computer system using multiple power converter circuits to generate respective voltage levels on multiple power supply nodes. The power delivery system includes a step-down power converter circuit that generates a voltage level for use by host and follower power converter circuits. The host power converter circuit generates an external demand current that is shared by multiple follower power converter circuits to regulate the voltage level on the multiple power supply nodes. The power delivery system can be scaled to different platforms of the computer system by adjusting the number of follower power converter circuits.

20 Claims, 15 Drawing Sheets

(56) References Cited

U.S. PATENT DOCUMENTS

| | | | |
|---|---|---|---|
| 2021/0247827 A1 | 8/2021 | Couleur et al. | |
| 2021/0273565 A1 | 9/2021 | Pant et al. | |
| 2021/0382511 A1 | 12/2021 | Kim et al. | |
| 2022/0123656 A1* | 4/2022 | Wu | H02M 3/1588 |
| 2023/0048248 A1* | 2/2023 | Fletcher | H02M 3/1584 |

OTHER PUBLICATIONS

International Search Report and Written Opinion in PCT Appl. No. PCT/US2023/029629 mailed Nov. 21, 2023, 9 pages.

* cited by examiner

|  | 901 | 902 | 903 |
|---|---|---|---|
| Platform 904 | N Phase Circuits | - | - |
| Platform 905 | A Phase Circuits | B Phase Circuits | - |
| Platform 906 | D Phase Circuits | E Phase Circuits | F Phase Circuits |

Regulated Power Supply Nodes

FIG. 9

SCALABLE POWER DELIVERY SYSTEM

BACKGROUND

Technical Field

This disclosure relates to power management in computer systems, and, more particularly, to voltage regulator circuit operation.

Description of the Related Art

Modern computer systems may include multiple circuit blocks designed to perform various functions. For example, such circuit blocks may include processors or processor cores configured to execute software or program instructions. Additionally, the circuit blocks may include memory circuits, mixed-signal or analog circuits, and the like.

In some computer systems, the circuit blocks may be designed to operate using different power supply voltage levels. For example, in some computer systems, power management integrated circuits (also referred to as "power management units") may generate and monitor various power supply signals.

Power management circuits often include one or more power converter circuits configured to generate regulator voltage levels on respective power supply signal lines using a voltage level of an input power supply signal. Such converter circuits may employ multiple reactive circuit elements, such as inductors, capacitors, and the like.

BRIEF DESCRIPTION OF THE DRAWINGS

FIG. 9 illustrates a diagram of possible power delivery system configurations utilizing a power converter circuit capable of driving multiple regulated power supply nodes.

Figure 1:
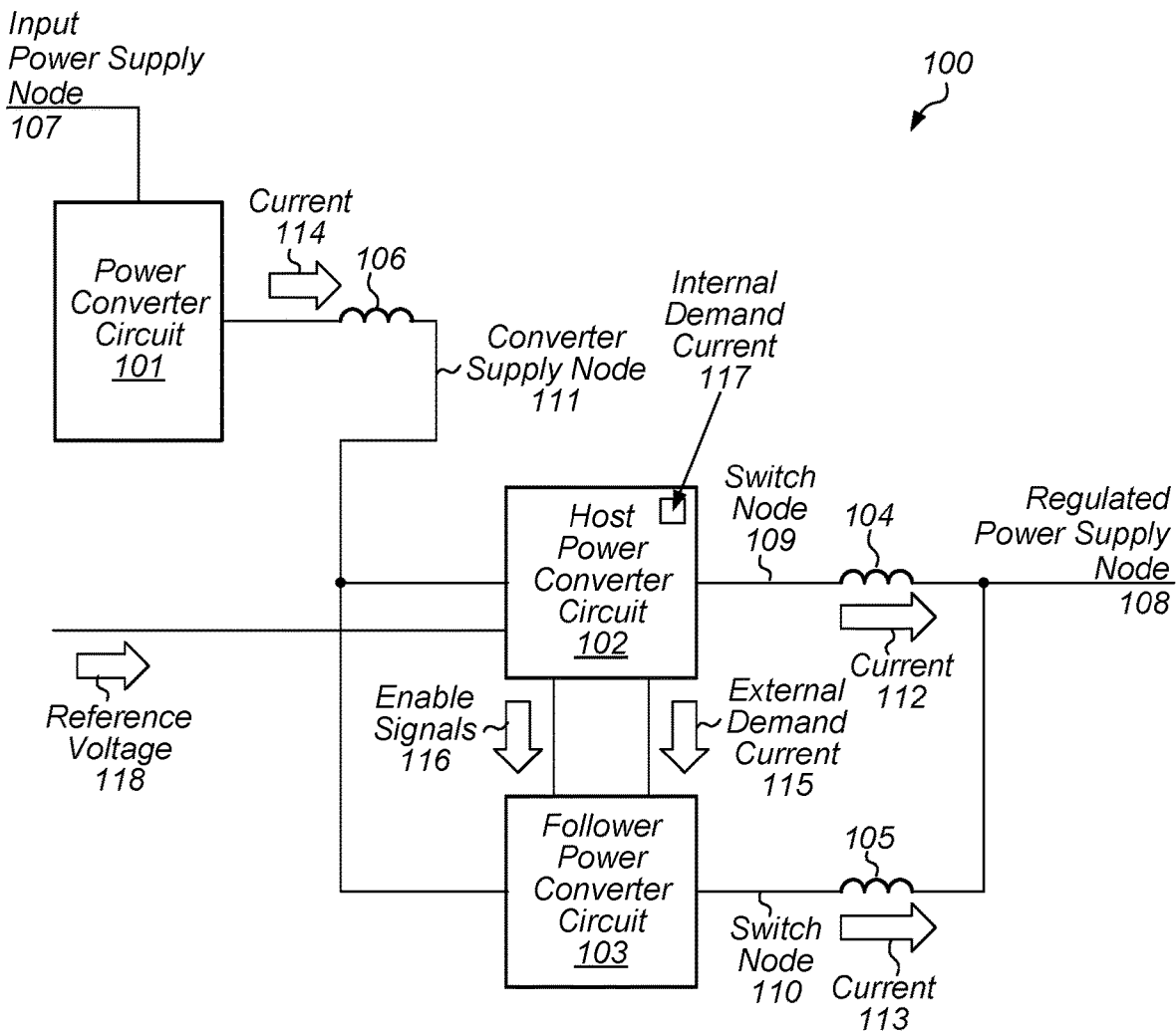
FIG. 1 illustrates a block diagram of an embodiment of a power delivery system for a computer system.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed but, on the contrary, the intention is to cover all modifications, equivalents and alternatives falling within the spirit and scope of the appended claims.

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple power converter or voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include multiple switches (also referred to as "power switches") and a switch node that is coupled to a regulated power supply node via an inductor. One switch is coupled between an input power supply node and the switch node, and is referred to as the "high-side switch." Another switch is coupled between the switch node and a ground supply node, and is referred to as the "low-side switch."

When the high-side switch is closed (referred to as "on-time"), energy is applied to the inductor, resulting in the current through the inductor increasing. During this time, the inductor stores energy in the form of a magnetic field. When the high-side switch is opened and the low-side switch is closed (referred to as "off-time"), energy is no longer being applied to the inductor, and the voltage across the inductor reverses, which results in the inductor functioning as a current source, with the energy stored in the inductor's magnetic field supporting the current flowing into the load. The process of closing and opening the high-side and low-side switches is performed periodically to maintain a desired voltage level on the power supply node.

Power converter circuits may employ different regulation modes to determine periodicity and duration of on-times and off-times. As used herein, a regulation mode refers to a particular method of detecting operating conditions to determine frequencies and durations of on-times and off-times employed by a power converter circuit. For example, a power converter circuit may detect a maximum current flowing through its inductor to determine an end of an on-time period. This type of regulation mode is referred to as a "peak-current regulation mode." Alternatively, a power converter circuit may detect a minimum current flowing through its inductor to determine an end of an off-time period. This type of regulation mode is referred to as a "valley-current regulation mode."

As the level of integration increases, power converter circuits need to supply increasing amounts of current to load circuits. For example, in some cases, power converter circuits need to be able to supply 100A or more to load circuits. In some cases, to allow for the increases in load current, higher voltage input power supplies (e.g., batteries) may be employed, further complicating the design of power converter circuits to allow for the higher input voltages.

Existing power converter circuit solutions are limited by thermal budgets, packaging requirements, and input voltages. As a result, the scalability of current power converter circuit designs is limited and inefficient for higher current applications. Moreover, the efficiency of power converter circuits at smaller loads must be maintained, and the design of power converter circuits must be flexible to allow for changes in current requirements at late stages in the design process, as well as support different numbers of regulated power supply nodes across different platforms such as tablets, laptop computers, and the like.

Techniques described in the present disclosure allow for a power delivery system that employs a host power converter circuit that generates a shared demand current used by multiple follower power converter circuits. The shared demand current makes it easy to add or subtract follower power converter circuits to adapt to changes in load current as a computer system design evolves. The use of such host and follower power converter circuits allows for multiple power delivery platforms to be supported using a single set of power converter circuits. Additionally, an initial step-down power converter circuit can be employed to accommodate a higher input voltage sources in certain power delivery platforms.

Turning to FIG. 1, a block diagram of a power converter system is depicted. As illustrated, power delivery system 100 includes power converter circuit 101, host power converter circuit 102, follower power converter circuit 103, and inductors 104-106. It is noted that power converter circuit 101, host power converter circuit 102, and follower power converter circuit 103 may be located on a common integrated circuit. In some cases, inductors 104-106 may also be located on the common integrated circuit. Alternatively, inductors 104-106 may be located on a different integrated circuit or mounted on a circuit board or other substrate to which the common integrated circuit is mounted. In some embodiments, one or more of inductors 104-106 may be mounted on the common integrated circuit, for example, as a chiplet.

Power converter circuit 101 is coupled to converter supply node 111 via inductor 106, and is configured to generate a particular voltage level on converter supply node 111 using a voltage level of input power supply node 107. In various embodiments, the particular voltage level is less than the voltage level of input power supply node 107. Power converter circuit 101 can be referred to as a "step-down power converter" as it generates a lower voltage for other power converter circuits, such as host power converter circuit 102 and follower power converter circuit 103, that cannot employ the higher voltage level of input power supply node 107.

In various embodiments, power converter circuit 101 may be implemented as a buck converter circuit that employs either peak-current regulation or valley-current regulation. Although power converter circuit 101 is depicted as being coupled to converter supply node 111 via a single inductor, in other embodiments, power converter circuit 101 may include multiple phase circuits each coupled to converter supply node 111 via corresponding inductors.

Host power converter circuit 102 is coupled to regulated power supply node 108 via inductor 104. In various embodiments, host power converter circuit 102 is configured to generate internal demand current 117 and external demand current 115 using (e.g., based on) a voltage level of regulated power supply node 108 and reference voltage 118. In some embodiments, host power converter circuit 102 is also configured to generate enable signals 116 using the voltage level of regulated power supply node 108 and reference voltage 118. Host power converter circuit 102 is also configured to source, based on internal demand current 117, current 112 to regulated power supply node 108 using a voltage level of converter supply node 111.

Follower power converter circuit 103 is coupled to regulated power supply node 108 via inductor 105. In various embodiments, follower power converter circuit 103 is configured to source, based on external demand current 115, current 113 to regulated power supply node 108 using the voltage level of converter supply node 111. As described below, follower power converter circuit 103 is further configured to source current 113 to regulated power supply node 108 based on enable signals 116, which can be used to activate or deactivate follower power converter circuit 103 or individual phase circuits included within follower power converter circuit 103.

Although only a single follower power converter circuit is depicted in FIG. 1, in other embodiments, multiple follower power converter circuits may be employed. In such cases, each of the multiple follower power converter circuits share external demand current 115 which provides a desired amount of output current per phase for the multiple follower power converter circuits. Sharing external demand current 115 in this fashion allows power delivery systems to be easily scaled, by adding or subtracting follower power converter circuits to be able to source a desired amount of current to a particular regulated power supply node. In some embodiments, a follower power converter circuit (e.g., follower power converter circuit 103) is characterized as a follower power converter circuit because it is configured to receive one or more enable signals (e.g, enable signals 116) and/or receive external demand current (e.g., external demand current 115) from a host power converter circuit (e.g., host power converter circuit 102).

Figure 2:
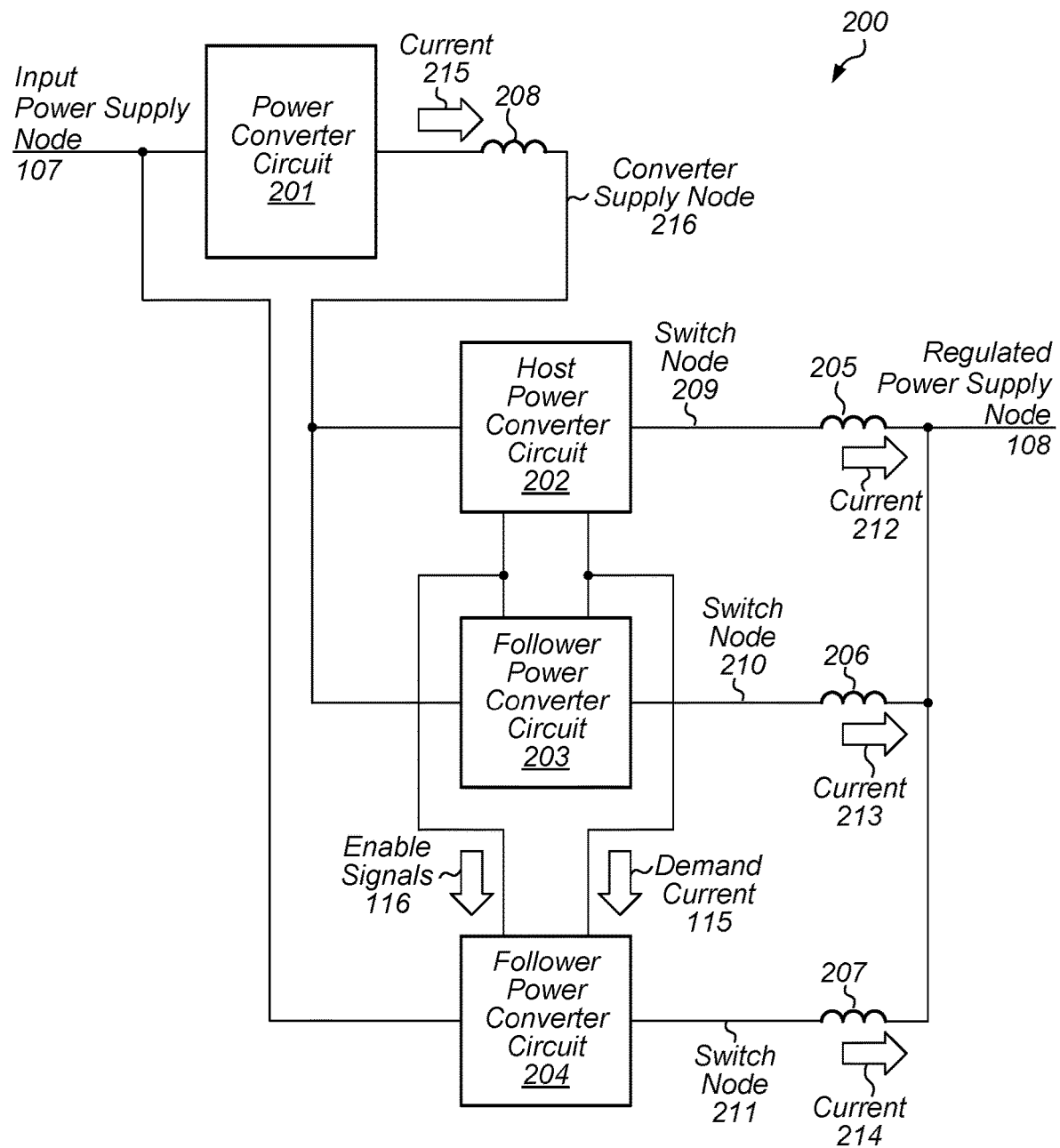
FIG. 2 illustrates a block diagram of another embodiment of a power delivery system.

In some cases, follower power converter circuits that are capable of using a higher input voltage may be included in a power delivery system. A block diagram of another embodiment of a power delivery system is depicted in FIG. 2. As illustrated, power delivery system 200 includes power converter circuit 201, host power converter circuit 202, follower power converter circuits 203 and 204, and inductors 205-208.

Power converter circuit 201 is coupled to converter supply node 216 via inductor 208, and is configured to generate a particular voltage level on converter supply node 216 using a voltage level of input power supply node 107. In various embodiments, the particular voltage level is less than the voltage level of input power supply node 107. Power converter circuit 201 may, in some embodiments, correspond to power converter circuit 101 as depicted in the embodiment of FIG. 1.

Host power converter circuit 202 is coupled to regulated power supply node 108 via inductor 205. In various embodiments, host power converter circuit 202 is configured to generate an internal demand current (such as internal demand current 117 described above with respect to FIG. 1) and external demand current 115 using a voltage level of regulated power supply node 108 and a reference voltage (such as reference voltage 118 described above with respect to FIG. 1). In some embodiments, host power converter circuit 202 is also configured to generate enable signals 116 using the voltage level of regulated power supply node 108 and the reference voltage. Host power converter circuit 202 is also configured to source, based on the internal demand current, current 212 to regulated power supply node 108 using a voltage level of converter supply node 216. Host power converter circuit 202 may, in various embodiments, correspond to host power converter circuit 102 as depicted in the embodiment of FIG. 1.

Follower power converter circuit 203 is coupled to regulated power supply node 108 via inductor 206. In various embodiments, follower power converter circuit 203 is configured to source, based at least in part on external demand current 115, current 213 to regulated power supply node 108 using the voltage level of converter supply node 216. Follower power converter circuit 203 may, in some embodiments, correspond to follower power converter circuit 103 as depicted in the embodiment of FIG. 1.

Follower power converter circuit 204 is coupled to regulated power supply node 108 via inductor 207. In various embodiments, follower power converter circuit 204 is configured to source, based on external demand current 115, current 214 to regulated power supply node 108 using the voltage level of input power supply node 107. In some embodiments, follower power converter circuit 204 is further configured to source current 214 to regulated power supply node 108 based on enable signals 116, which can be used to activate or deactivate follower power converter circuit 204 or individual phase circuits included within follower power converter circuit 204.

Although only two follower power converter circuits are depicted in FIG. 2, in other embodiments, more than 2 follower power converter circuits may be employed. Additional power converter circuits may employ either the voltage level of input power supply node 107 or converter supply node 216 to source respective currents to regulated power supply node 108.

Figure 3:
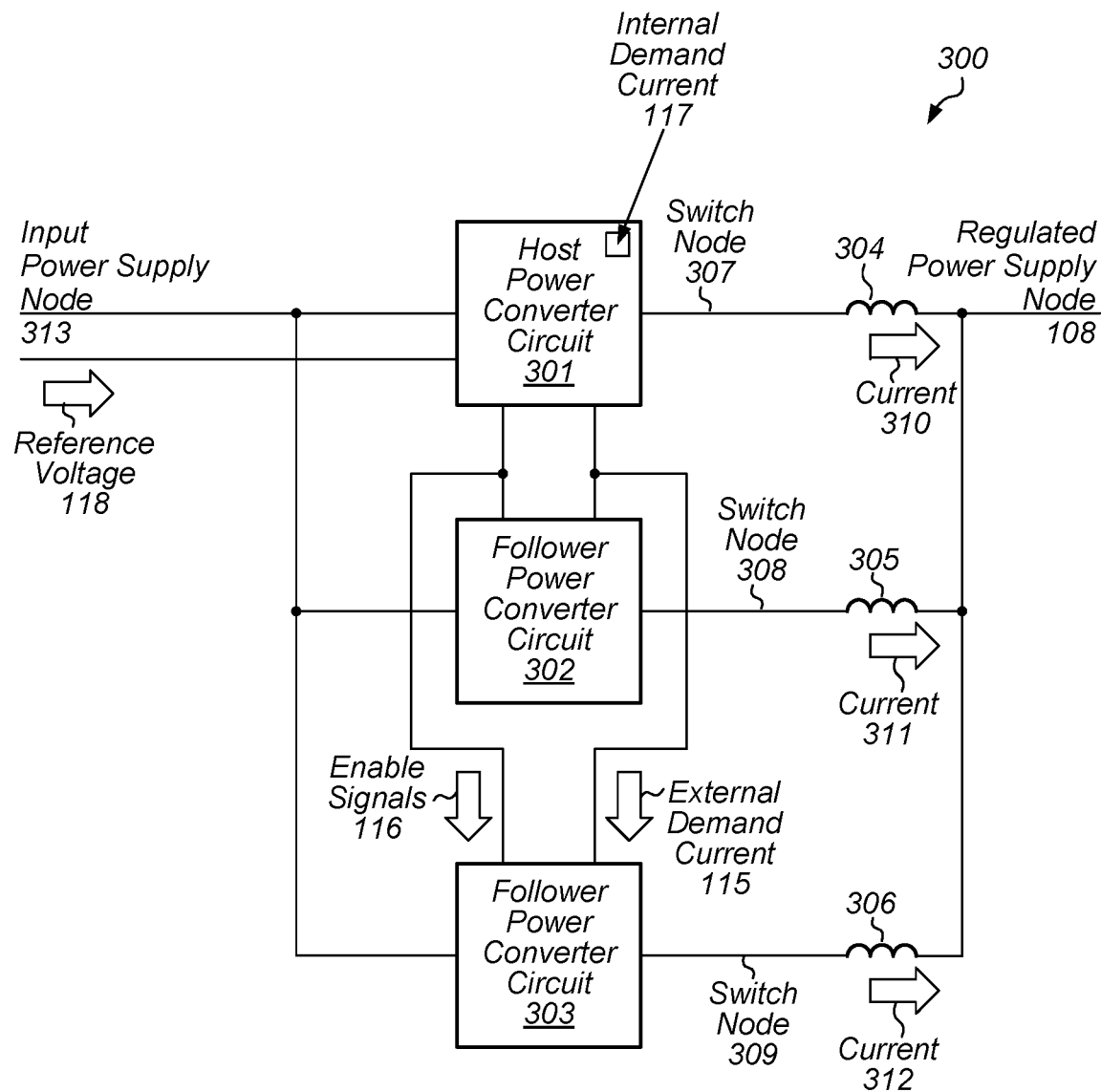
FIG. 3 illustrates a block diagram of a different embodiment of a power delivery system.

In some cases, an input power supply of suitable voltage for the host and follower power converter circuits is available in a computer system. In such cases, a step-down power converter circuit is not needed to generate a lower voltage level for the host and follower power converter circuits. Turning to FIG. 3, a block diagram of an embodiment of power delivery system without a step-down power converter circuit is depicted. As illustrated, power delivery system 300 includes host power converter circuit 301, follower power converter circuits 302 and 303, and inductors 304-306.

Host power converter circuit 301 is coupled to regulated power supply node 108 via inductor 304. In various embodiments, host power converter circuit 301 is configured to generate internal demand current 117 and external demand current 115 using a voltage level of regulated power supply node 108 and reference voltage 118. In some embodiments, host power converter circuit 301 is also configured to generate enable signals 116 using the voltage level of regulated power supply node 108 and reference voltage 118. Host power converter circuit 301 is also configured to source, based on internal demand current 117, current 310 to regulated power supply node 108 using a voltage level of input power supply node 313. It is noted that, in various embodiments, the voltage level of input power supply node 313 is less than the voltage level of input power supply node 107 as depicted in FIGS. 1 and 2.

Follower power converter circuit 302 is coupled to regulated power supply node 108 via inductor 305. In various embodiments, follower power converter circuit 302 is configured to source, based on external demand current 115, current 311 to regulated power supply node 108 using the voltage level of input power supply node 313. As described below, follower power converter circuit 302 is further configured to source current 311 to regulated power supply node 108 based on enable signals 116, which can be used to activate or deactivate follower power converter circuit 302 or individual phase circuits included within follower power converter circuit 302.

Follower power converter circuit 303 is coupled to regulated power supply node 108 via inductor 306. In various embodiments, follower power converter circuit 303 is configured to source, based on external demand current 115, current 312 to regulated power supply node 108 using the voltage level of input power supply node 313. As described below, follower power converter circuit 303 is further configured to source current 312 to regulated power supply node 108 based on enable signals 116, which can be used to activate or deactivate follower power converter circuit 303 or individual phase circuits included within follower power converter circuit 303.

Although only two follower power converter circuits are depicted in the embodiment of FIG. 2, in other embodiments, any suitable number of follower power converter circuits may be employed. In some cases, the number of follower power converter circuits may be based on a maximum load current to be drawn from regulated power supply node 108.

Figure 4:
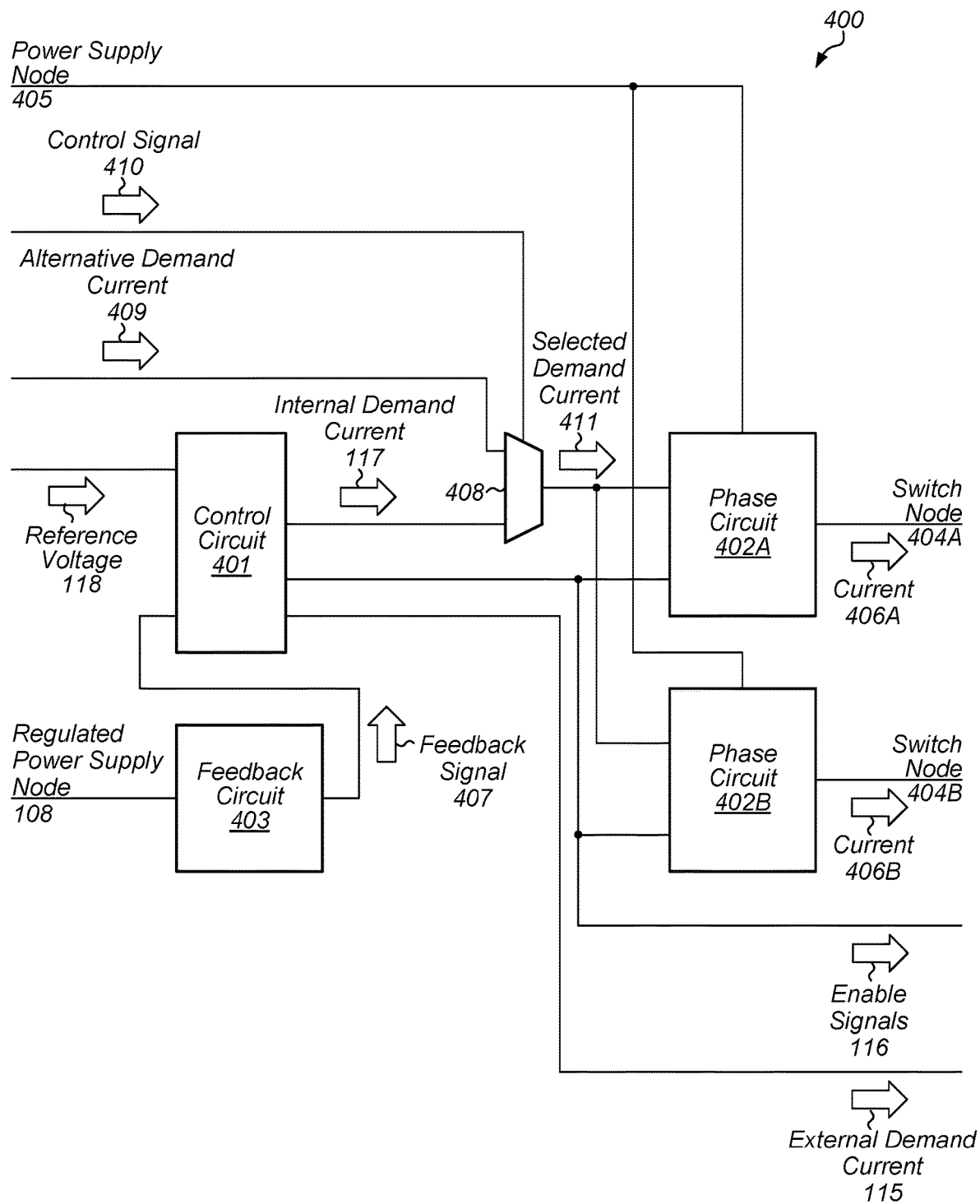
FIG. 4 illustrates a block diagram of an embodiment of a host power converter circuit.

Turning to FIG. 4, a block diagram of a host power converter circuit is depicted. As illustrated, host power converter circuit 400 includes control circuit 401, phase circuits 402A and 402B, feedback circuit 403, and multiplex circuit 408. It is noted that host power converter circuit 400 may, in various embodiments, correspond to host power converter circuit 102, host power converter circuit 202, or host power converter circuit 301.

Both phase circuits 402A and 402B are coupled to power supply node 405. In various embodiments, power supply node 405 may correspond to either input power supply node 107, converter supply node 111, converter supply node 216, or input power supply node 313. As described below, phase circuits 402A and 402B may include switch devices configured to coupled switch nodes 404A and 404B to power supply node 405 in order to source currents 406A and 406B, respectively. It is noted that switch nodes 404A and 404B may, in various embodiments, correspond to any of switch nodes 109, 110, 209-211, or 307-309. Although only two phase circuits are depicted in the embodiment of FIG. 4, in other embodiments, any suitable number of phase circuits may be employed.

Phase circuit 402A is configured to source current 406A to switch node 404A based on selected demand current 411 and a particular one of enable signals 116 received, for example, from control circuit 401. In a similar fashion, phase circuit 402B is configured to source current 406B to switch node 404B based on selected demand current 411 and a different one of enable signals 116. In various embodiments, phase circuits 402A and 402B function when their corresponding enable signals 116 are active. In cases when one or both of corresponding enable signals 116 are inactive, phase circuits 402A and 402B remain in an inactive or standby state.

Control circuit 401 is configured to generate internal demand current 117 and external demand current 115 based on a voltage level of regulated power supply node 108. In various embodiments, to generate internal demand current 117 and external demand current 115, control circuit 401 is further configured to perform a comparison of feedback signal 407 to reference voltage 118, and generate internal demand current 117 and external demand current 115 using a result of the comparison. In other embodiments, control circuit 401 is further configured to generate enable signals 116 using the result of the comparison. As described below, control circuit 401 may be implemented using a combination of analog and digital circuits.

Feedback circuit 403 is configured to generate feedback signal 407 based on a voltage level of regulated power supply node 108. In various embodiments, a voltage level of feedback signal 407 may be less than the voltage level of regulated power supply node 108. By scaling the voltage level of regulated power supply node 108 prior to comparing it to reference voltage 118, regulated power supply node 108 may be regulated to voltage levels higher than reference voltage 118. In various embodiments, feedback circuit 403 may be implemented using a resistive voltage divider circuit, or any other suitable circuit configured to scale an input voltage level to generate an output voltage level.

Multiplex circuit 408 is configured to generate selected demand current 411 by selecting one of alternative demand current 409 or internal demand current 117. In various embodiments, multiplex circuit 408 is further configured to select one of alternative demand current 409 or internal demand current 117 based on a value of control signal 410. By providing an alternative to internal demand current 117, host power converter circuit 400 may be used as a follower power converter circuit by changing the value of control signal 410. Multiplex circuit 408 may, in some embodiments, be implemented using multiple pass gate circuits coupled together in a wired-OR fashion and controlled by control signal 410.

Figure 5:
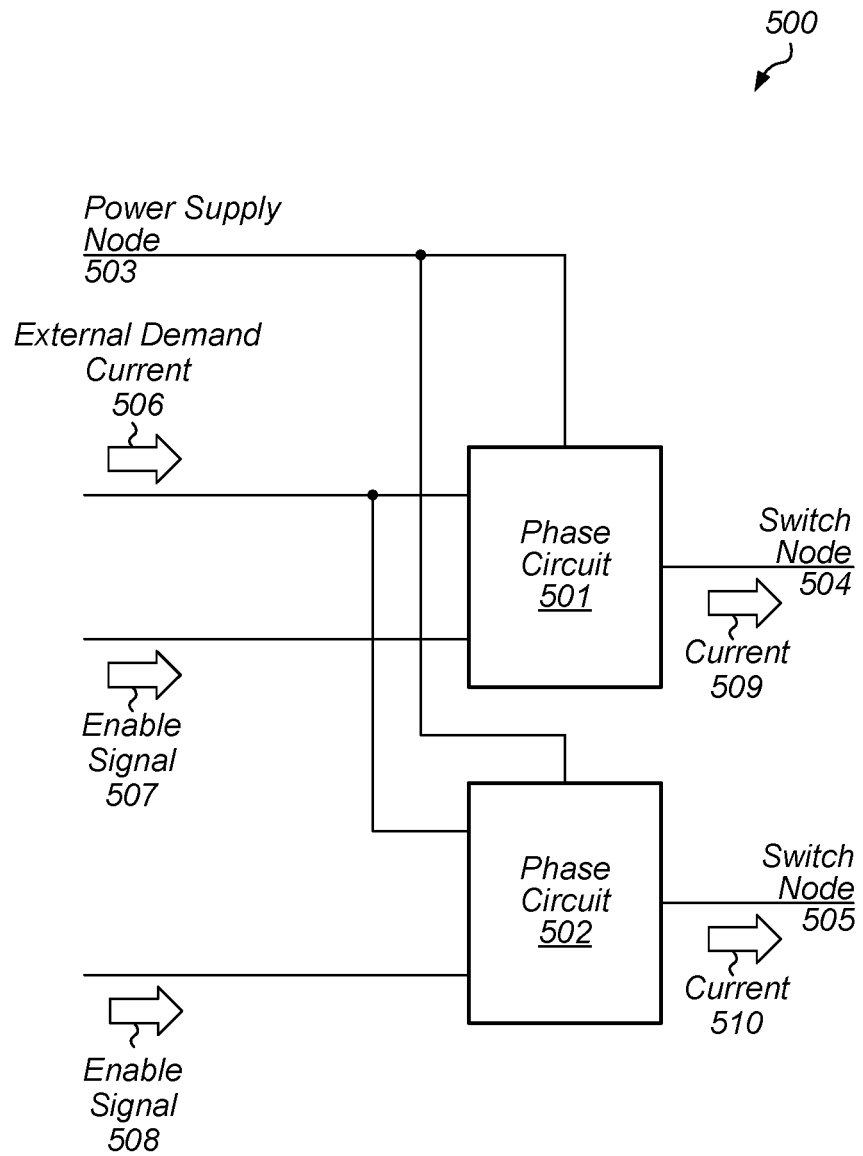
FIG. 5 illustrates a block diagram of an embodiment of a follower power converter circuit.

Turning to FIG. 5, a block diagram of a follower power converter circuit is depicted. As illustrated, follower power converter circuit 500 includes phase circuit 501 and phase circuit 502. In various embodiments, follower power converter circuit 500 may correspond to any of follower power converter circuits 103, 203, 204, 302, and 303.

Both phase circuit 501 and phase circuit 502 are coupled to power supply node 503. In some embodiments, as described above, power supply node 503 may correspond to an output node of a power converter circuit or step-down converter (e.g., converter supply node 216 of power converter circuit 201) or an input power supply node of a system, such as input power supply node 313 described above with respect to FIG. 3. As described below, phase circuits 501 and 502 may include switch devices configured to couple switch nodes 504 and 505 to power supply node 503 in order to source currents 509 and 510. Phase circuit 501 is configured to source current 509 to switch node 504 based on external demand current 506 and enable signal 507. In a similar fashion, phase circuit 502 is configured to source current 510 to switch node 505 based on external demand current 506 and enable signal 508. In various embodiments, phase circuits 501 and 502 function when enable signals 507 and 508 are active. In cases when one or both of enable signals 507 and 508 are inactive, the corresponding ones of phase circuits 501 and 502 remain in an inactive or standby state.

In various embodiments, phase circuits 501 and 502 can operate in either peak-current regulation mode or valley-current regulation mode. In peak-current regulation mode, phase circuits 501 and 502 stop sourcing currents 509 and 510 when their values match the value of external demand current 506. Alternatively, in valley-current regulation mode, phase circuits 501 and 502 may stop their respective off-times based on a comparison of external demand current 506 and currents 509 and 510. For example, in some embodiments, phase circuits 501 and 402 may stop their respective off-times in response to a determination that currents 509 and 510 are less than external demand current 506.

It is noted that although two phase circuits are depicted in the embodiment of FIG. 5, in other embodiments, any suitable number of phase circuits may be employed. In some cases, two of the phase circuits may be coupled to a common regulated power supply node via a set of inductors sharing a common core (referred to as "coupled inductors").

Figure 6:
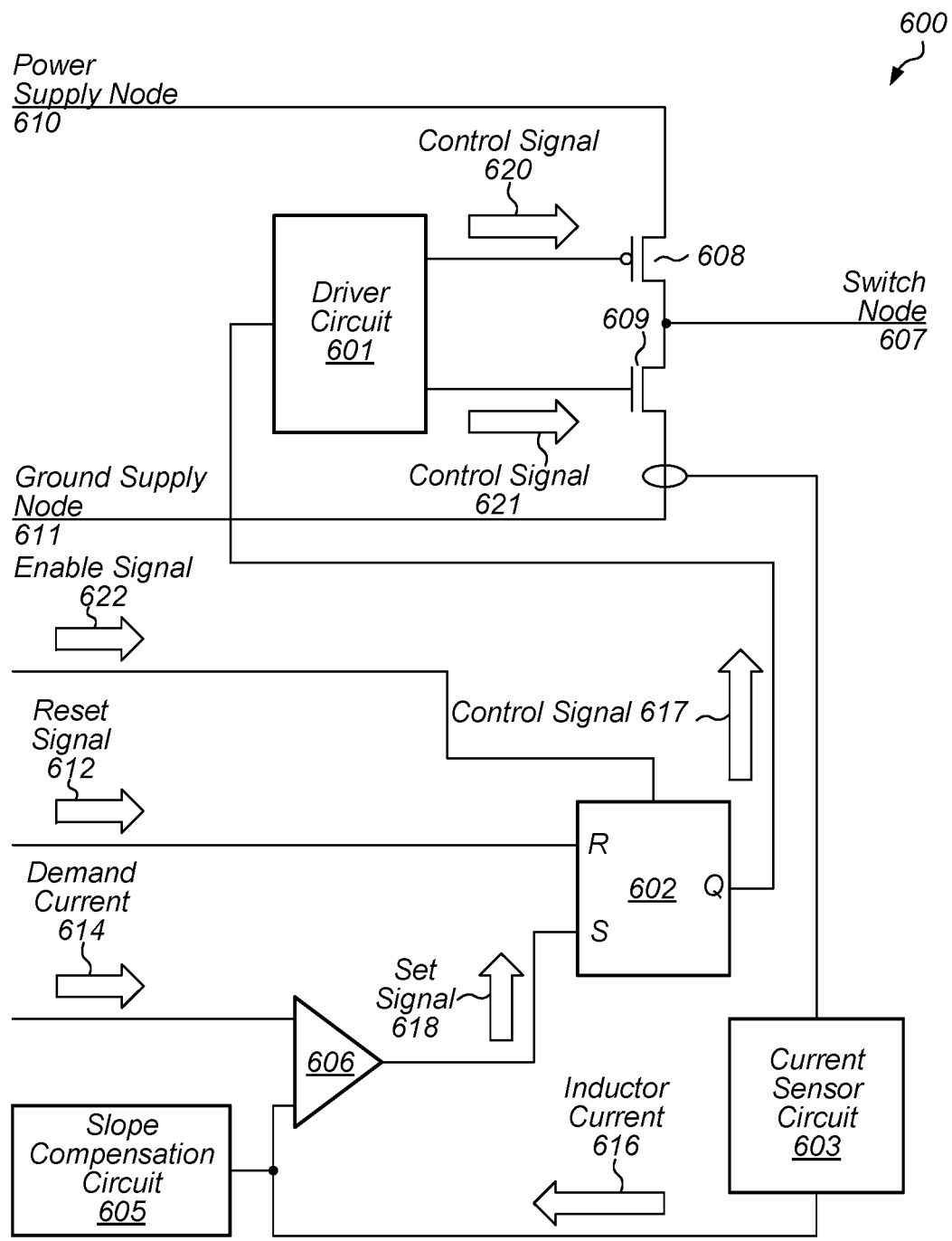
FIG. 6 illustrates a block diagram of an embodiment of a phase circuit included in a power converter circuit.

Turning to FIG. 6, a block diagram of an embodiment of a phase circuit is depicted. As illustrated, phase circuit 600 includes driver circuit 601, device 608, device 609, latch circuit 602, comparator circuit 606, slope compensation circuit 605, and current sensor circuit 603. In various embodiments, phase circuit 600 may correspond to any of phase circuits 402A-B, 501, or 502.

Device 608 is coupled between input power supply node 610 and switch node 607, and is controlled by control signal 620. In a similar fashion, device 609 is coupled between switch node 607 and ground supply node 611, and is controlled by control signal 621. In various embodiments, switch node 607 may be further coupled to an inductor, which is, in turn, coupled to a regulated power supply node.

In response to an activation of control signal 620, device 608 is configured to couple input power supply node 610 to switch node 607, allowing current to flow through into an inductor, magnetizing the inductor. In response to an activation of control signal 621, device 609 is configured to couple switch node 607 to ground supply node 611. With switch node 607 coupled to ground supply node 611, energy is no longer being supplied to the inductor, causing the magnetic field of the inductor to collapse. As the magnetic field collapses, the inductor functions as a current source, providing current to the regulated power supply node.

In various embodiments, device 608 may be implemented as a p-channel metal-oxide semiconductor field-effect transistor (MOSFET), a Fin field-effect transistor (FinFET), a gate-all-around field-effect transistor (GAAFET), or any other suitable transconductance device. Device 609 may, in some embodiments, be implemented as an n-channel MOSFET, FinFET, GAAFET, or any other suitable transconductance device.

Driver circuit 601 is configured to generate control signal 620 and control signal 621 using control signal 617. In various embodiments, driver circuit 601 may be configured, in response to an activation of control signal 617, to activate control signal 620 and deactivate control signal 621. Driver circuit 601 may be further configured, in response to a deactivation of control signal 617, to deactivate control signal 620 and activate control signal 621. In some embodiments, driver circuit 601 may include any suitable combination of logic gates, sequential logic circuit elements, MOSFETs, FinFETs, GAAFETs, or any other suitable transconductance devices.

Latch circuit 602 is configured to deactivate control signal 617 using reset signal 612, set signal 618, and enable signal 622. In some embodiments, latch circuit 602 is configured to activate control signal 617 in response to an activation of set signal 618 while enable signal 622 is active, and deactivate control signal 617 in response to an activation of reset signal 612 while enable signal 622 is active. In various embodiments, reset signal 612 may be a clock signal or other suitable timing reference signal. Latch circuit 602 is configured to deactivate control signal 617 in response to a determination that enable signal 622 is inactive. In various embodiments, latch circuit 602 may be implemented as a set-reset (SR) latch circuit that includes any suitable combination of logic gates.

Current sensor circuit 603 is configured to generate inductor current 616. In various embodiments, current sensor circuit 603 may measure a voltage drop across device 609 and generate inductor current 616 using the measured voltage drop. Current sensor circuit 603 may include any suitable combination of reference and amplifier circuits.

Slope compensation circuit 605 is configured to modify inductor current 616. In various embodiments, slope compensation circuit 605 may be configured, in a process referred to as "slope compensation," to combine a periodic current ramp with inductor current 616. It is noted that slope compensation is used to improve the stability of phase circuit 600 by increasing a frequency at which the regulator feedback loop can operate, thereby reducing a time for phase circuit 600 to recover from transients.

Comparator circuit 606 is configured to generate set signal 618 using demand current 614 and inductor current 616. It is noted that demand current 614 may correspond to either internal demand current 117, external demand current 115, or any other suitable demand current. Comparator circuit 606 may, in some embodiments, be configured to compare demand current 614 to inductor current 616, and, in response to a determination that demand current 614 is less than inductor current 616, activate set signal 618. In various embodiments, comparator circuit 606 may be implemented using a differential amplifier circuit, a Schmitt trigger circuit, or any other suitable comparator circuit.

Figure 7:
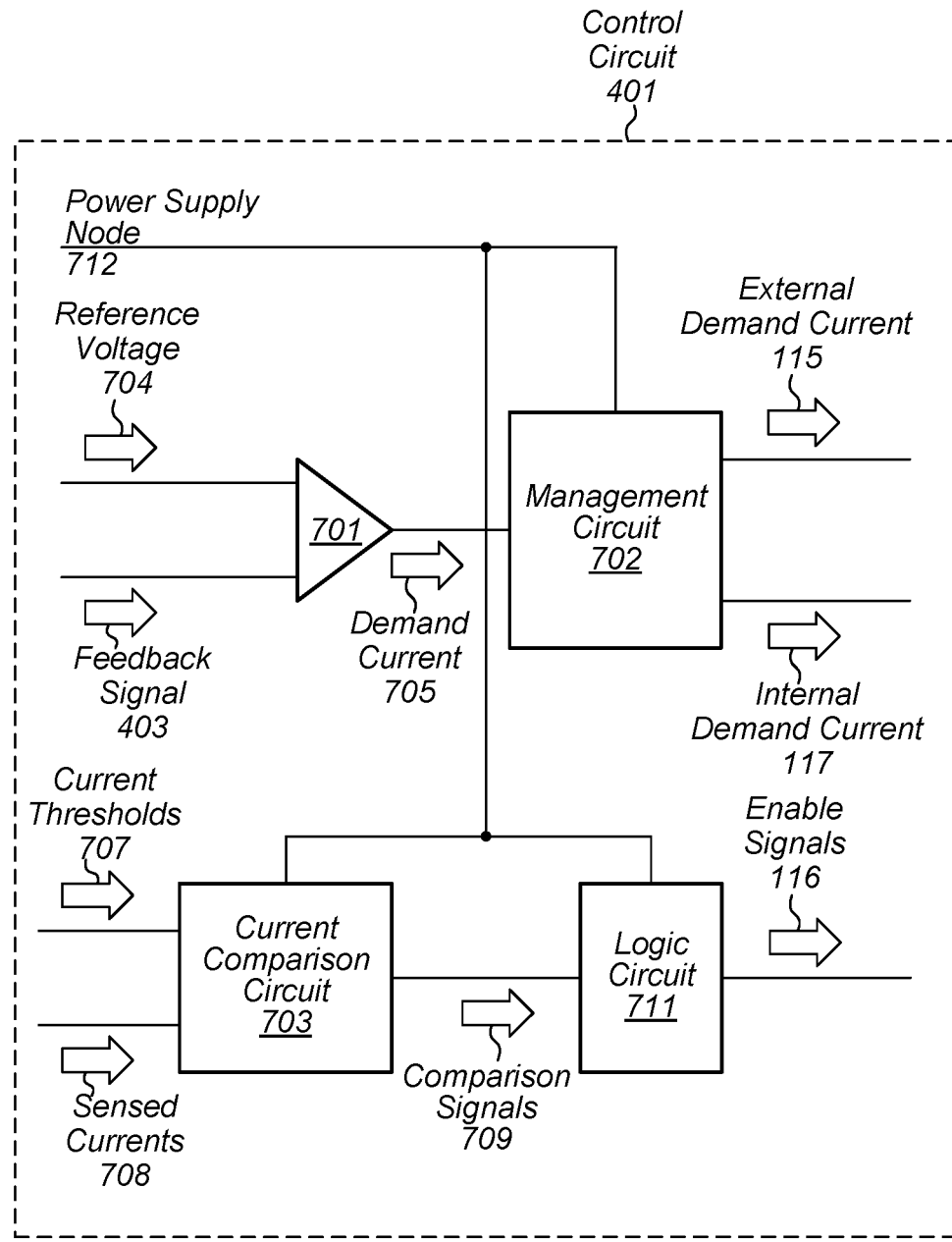
FIG. 7 illustrates a block diagram of a control circuit for a phase circuit included in a power converter circuit.

Turning to FIG. 7, a block diagram of an embodiment of control circuit 401 is depicted. As illustrated, control circuit 401 includes error amplifier 701, management circuit 702, current comparison circuit 703, and logic circuit 711.

Error amplifier 701 is configured to generate demand current 705 using reference voltage 704 and feedback signal 403. In various embodiments, a value of feedback signal 403 may be based on a voltage level of regulated power supply node 108. Error amplifier 701 may, in various embodiments, be configured to generate demand current 705 such that a value of demand current 705 is proportional to a difference between reference voltage 704 and feedback signal 403. In some embodiments, error amplifier 701 may be implemented using a differential amplifier circuit, or any other suitable comparator circuit.

Management circuit 702 is configured to generate external demand current 115 and internal demand current 117 using demand current 705. Although a single external demand current and a single internal demand current are depicted in the embodiment of FIG. 7, in other embodiments, management circuit 702 may be configured to generate any suitable number of internal and external demand currents. In some embodiments, management circuit 702 may be configured to scale demand current 705 in order to generate external demand current 115 and internal demand current 117. Management circuit 702 may, in various embodiments, include any suitable combination of current mirror circuits, amplifier circuits, and bias circuits.

Current comparison circuit 703 is configured to generate comparison signals 709 using sensed currents 708 and current thresholds 707. It is noted that sensed currents 708 may correspond to currents flowing in inductors 104 and 105. In various embodiments, current comparison circuit 703 may be configured to compare a given one of sensed currents 708 to a corresponding one of current thresholds 707 to generate a particular one of comparison signals 709.

Current comparison circuit 703 may, in various embodiments, be implemented using multiple differential amplifier circuits, or other comparator circuits, with resistors coupled to their respective inputs in order to convert current thresholds 707 and sensed currents 708 to voltages for comparison. In some embodiments, additional circuits, e.g., Schmitt trigger circuits, may be used to convert the output of the differential amplifier circuits to digital values for comparison signals 709.

Logic circuit 711 is configured to generate enable signals 116 using comparison signals 709. In various embodiments, logic circuit 711 may be configured to activate a given one of enable signals in response to a determination that a number of comparison signals 709 has exceed a threshold value. For example, if two enable signals are active and the comparison signals for the two phase circuits coupled to the active enable signals are active, then the current limit for the two phase circuits has been reached, and logic circuit 711 may activate a third enable signal to activate a third phase circuit. By generating enable signals 116 in such a fashion, increases or decreases in the load current drawn from regulated power supply node 108 result in a corresponding increase or decrease in the number of active phase circuits. Adjusting the number of active phase circuits can ensure that there are an adequate number of phase circuits active to supply the needed current and prevent undesirable drops in the voltage level of regulated power supply node 108.

Logic circuit 711 may, in various embodiments, be implemented using any suitable combination of combinatorial logic and sequential logic circuits. In some cases, logic circuit 711 may be implemented as a microcontroller or general-purpose processor circuit configured to execute software or program instructions.

In some cases, a power converter circuit can be used to regulate the voltage levels on multiple power supply nodes. To accomplish this, a power converter circuit can generate multiple internal demand currents using the respective voltage levels of the multiple power supply nodes. With the use of multiplex circuits, a single power converter circuit can be used in a variety of environments, each with a different number of regulated power supply nodes.

Figure 8:
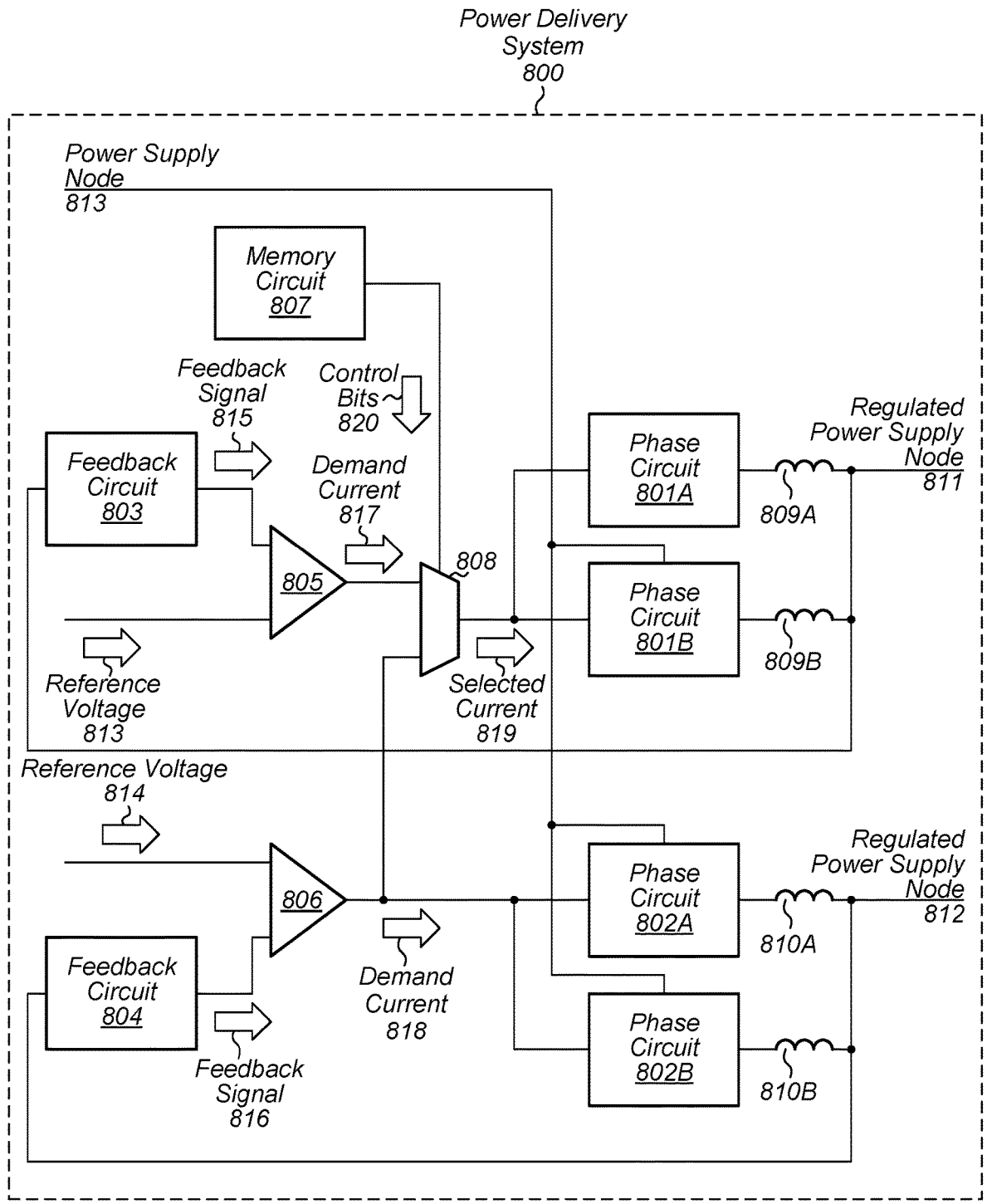
FIG. 8 illustrates a block diagram of an embodiment of a power delivery system for driving multiple regulated power supply nodes.

A block diagram of an embodiment of a power delivery system capable of supporting multiple regulated power supply nodes is depicted in FIG. 8. As illustrated, power delivery system 800 includes phase circuits 801A-801B, phase circuits 802A-802B, feedback circuits 803 and 804, comparator circuits 805 and 806, memory circuit 807, and multiplex circuit 808. It is noted that, in some embodiments, the functions associated with selecting a particular demand current from multiple demand currents may be employed in a host power converter circuit or a follower power converter circuit as described above.

Phase circuits 801A and 801B are coupled to regulated power supply node 811 via inductors 809A and 809B, respectively. In a similar fashion, phase circuits 802A and 802B are coupled to regulated power supply node 812 via inductors 810A and 810B, respectively. Phase circuits 801A and 801B are configured to source respective currents to regulated power supply node 811 based on selected current 819 and using a voltage level of power supply node 813. Phase circuits 802A and 802B are configured to source respective currents to regulated power supply node 812 based on demand current 818 and using the voltage level of power supply node 813. In various embodiments, phase circuits 801A, 801B, 802A, and 802B may correspond to phase circuit 600 as depicted in FIG. 6.

In the illustrated embodiment, since phase circuits 801A and 801B are coupled to a different regulated power supply node than phase circuits 802A and 802B, control bits 820 are selected to cause multiplex circuit 808 to select demand current 817 as selected current 819. In other embodiments, if phase circuits 801A and 801B are coupled to the same regulated power supply node as phase circuits 802A and 802B, then control bits 820 are selected to cause multiplex circuit 808 to select demand current 818 as selected current 819.

Feedback circuit 803 is configured to generate feedback signal 815 using the voltage level of regulated power supply node 811. In a similar fashion, feedback circuit 804 is configured to generate feedback signal 816 using the voltage level of regulated power supply node 812. In various embodiments, a voltage level of feedback signal 815 may be less than the voltage level of regulated power supply node 811, and a voltage level of feedback signal 816 may be less than the voltage level of regulated power supply node 812. Feedback circuit 803 and feedback circuit 804 may, in various embodiments, be implemented using resistive voltage divider circuits or other suitable circuits.

Comparator circuit 805 is configured to generate demand current 817 using feedback signal 815 and reference voltage 813. In some embodiments, to generate demand current 817, comparator circuit 805 is further configured to perform a comparison of feedback signal 815 and reference voltage 813, and to generate demand current 817 using a result of the comparison.

Comparator circuit 806 is configured to generate demand current 818 using feedback signal 816 and reference voltage 814. In some embodiments, to generate demand current 818, comparator circuit 806 is further configured to perform a comparison of feedback signal 816 and reference voltage 814, and to generate demand current 818 using a result of the comparison.

In various embodiments, comparator circuit 805 and comparator circuit 806 may be implemented as operational transconductance amplifier (OTA) circuits or any other suitable comparator circuit. Although two comparator circuits are depicted in the embodiment of FIG. 8, in other embodiments, any suitable number of comparator circuits may be employed. In some cases, a number of comparator circuits included in power delivery system 800 may be based on a number of regulated power supply nodes that power delivery system is designed to support.

Multiplex circuit 808 is configured to generate selected current 819 by selecting, based on control bits 820, one of demand current 817 or demand current 818. In various embodiments, multiplex circuit 808 may be implemented using multiple pass gate circuits coupled together in a wired-OR fashion and controlled by control bits 820. Although only a single multiplex circuit is depicted in the embodiment of FIG. 8, in other embodiments, any suitable number of multiplex circuits may be employed. In some cases, a number of multiplex circuits included in power delivery system 800 may correspond to a number of regulated power supply nodes that can be supported by power delivery system 800.

Memory circuit 807 is configured to store control bits 820. In various embodiments, memory circuit 807 may be implemented as a one-time programmable memory circuit, a read-only memory (ROM) circuit, or any other suitable type of non-volatile memory circuit.

As described above, a power delivery system can be designed to support multiple regulated power supply nodes. Such a power delivery system could be deployed across different power delivery platforms, each with a different number of regulated power supply nodes, by setting control bits, e.g., control bits 820, to route demand currents for the various regulated power supply nodes as necessary.

Turning to FIG. 9, a chart depicting how a power delivery system with a total of N phase circuits, where N is a positive integer, may be used to realize different power delivery platforms with different numbers of regulated power supply nodes.

Platform 904 makes use of only regulated power supply node 901. In this case, all N phase circuits included in the power delivery system are coupled to regulated power supply node 901 via corresponding inductors. As described above, control bits 820 are selected to route a demand current generated using the voltage level of regulated supply node 901 is routed to all of the phase circuits.

Platform 905 makes use of regulated power supply node 901 and regulated power supply node 902. As illustrated, A phase circuits are coupled to regulated power supply node 901 and B phase circuits are coupled to regulated power supply node 902. The A phase circuits use a demand current generated using the voltage level of regulated power supply node 901, while the B phase circuits use a different demand current generated using the voltage level of regulated power supply node 902. It is noted that, in some embodiments, the total of N phase circuits may be divided equally between the A phase circuits and the B phase circuits. Alternatively, more phase circuits may be included in the A phase circuits than the B phase circuits, if the load current for regulated power supply node 901 is greater than the load current for regulated power supply node 902. In some cases, some of the total of N phase circuits may be left unassigned to either of regulated power supply nodes 901 and 902 based on the load currents for regulated power supply nodes 901 and 902.

Platform 906 uses regulated power supply nodes 901-903. The D phase circuits are coupled to regulated power supply node 901, the E phase circuits are coupled to regulated power supply node 902, and the F phase circuits are coupled to regulated power supply node 903. The D phase circuits, the E phase circuits, and the F phase circuits use corresponding demand currents generated using the respective voltage levels of regulated power supply nodes 901-903. The number of phase circuits included in each of the D phase circuits, the E phase circuits, and the F phase circuits may be based on the load currents for regulated power supply nodes 901-903, respectively.

It is noted that the different power delivery platforms depicted in the chart of FIG. 9 are merely examples. In other cases, different numbers of regulated power supply nodes and different numbers of phase circuits allocated to the different active regulated power supply nodes are possible and contemplated.

To summarize, various embodiments of a power delivery system for a computer system are disclosed. Broadly speaking, an apparatus is contemplated in which a first power converter circuit may be configured to generate a particular voltage level on a converter power supply using a voltage level of an input power supply node. In various embodiments, the particular voltage level is less than the voltage level of the input power supply node.

A host power converter circuit coupled to a regulated power supply node via a first inductor may be configured to generate an internal demand current and an external demand current using a voltage level of the regulated power supply node and a reference voltage. The host power converter circuit may also be configured to source, based on the internal demand current, a first current to the regulated power supply node using a voltage level of the converter power supply node.

A first follower power converter circuit coupled to the regulated power supply node via a second inductor may be configured to source, based on the external demand current, a second current to the regulated power supply node using the voltage level of the converter supply node. In other embodiments, a second follower power converter circuit coupled to the regulated power supply node via a third inductor may be configured to source, based on the external demand current, a third current to the regulated power supply node using the voltage level of the input power supply node.

Figure 10:
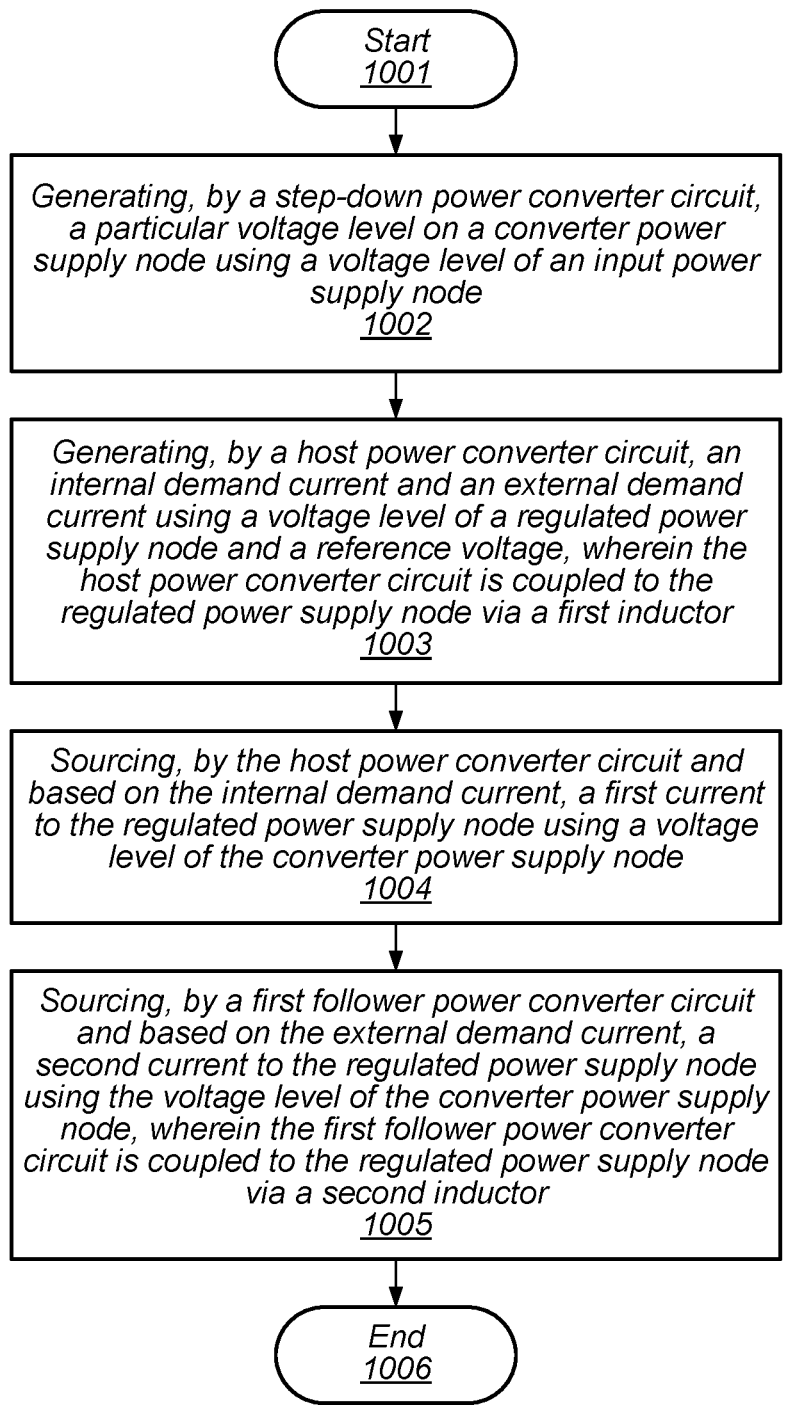
FIG. 10 illustrates a flow diagram that depicts an embodiment of a method for operating a power converter system with an initial power converter stage.

Turning to FIG. 10, a flow diagram depicting an embodiment of a method for operating a power delivery system with an initial power converter stage is illustrated. The method, which begins in block 1001, may be applied to various power delivery systems including power delivery system 100 as depicted in FIG. 1.

The method includes generating, by a step-down power converter circuit, a particular voltage level on a converter power supply node using a voltage level of an input power supply node (block 1002). In various embodiments, the particular voltage level is less than the voltage level of the input power supply node.

The method further includes generating, by a host power converter circuit, an internal demand current and an external demand current using a voltage level of a regulated power supply node and a reference voltage, wherein the host power converter circuit is coupled to the regulated power supply node via a first inductor (block 1003). In some embodiments, the method also includes generating, by the host power converter circuits, a plurality of enable signals using the voltage level of the regulated power supply node and the reference voltage.

In some embodiments, generating the external demand current and the internal demand current may include generating, by the host power converter circuit, a feedback signal using the voltage level of the regulated power supply node, and performing, by the host power converter circuit, a comparison of the feedback signal and the reference voltage. The method may further include generating, by the host power converter circuit, the external demand current and the internal demand current using a result of the comparison.

The method also includes sourcing, by the host power converter circuit and based on the internal demand current, a first current to the regulated power supply node using a voltage level of the converter power supply node (block 1004).

The method further includes sourcing, by a first follower power converter circuit and based on the external demand current, a second current to the regulated power supply node using the voltage level of the converter power supply node, wherein the first follower power converter circuit is coupled to the regulated power supply node via a second inductor (block 1005).

In some embodiments, the first follower power converter circuit includes a first phase circuit coupled to the regulated power supply node via a third inductor, and a second phase circuit coupled to the regulated power supply node via a fourth inductor. In such cases, the method may further include sourcing, by the first phase circuit in response to determining a first enable signal of the plurality of enable signals has been activated, a first portion of the second current to the regulated power supply node. The method may also include sourcing, by the second phase circuit in response to determining a second enable signal of the plurality of enable signals has been activated, a second portion of the second current to the regulated power supply node.

In other embodiments, sourcing the first portion of the second current to the regulated power supply node may include performing a comparison of the external demand current to a sensed third inductor current, and activating a driver control signal using a result of the comparison. The method may further include coupling a first terminal of the third inductor to the converter power supply node in response to an activation of the driver control signal, wherein a second terminal of the third inductor is coupled to the regulated power supply node. The method may also include deactivating the driver control signal in response to an activation of a clock signal, and coupling the first terminal of the third inductor to a ground supply node in response to a deactivation of the driver control signal.

In various embodiments, the method may also include sourcing, by a second follower power converter circuit and based on the external demand current, a third current to the regulated power supply node using the voltage level of the input power supply node, wherein the second follower power converter circuit is coupled to the regulated power supply node via a third inductor. The method ends in block 1006.

Figure 11:
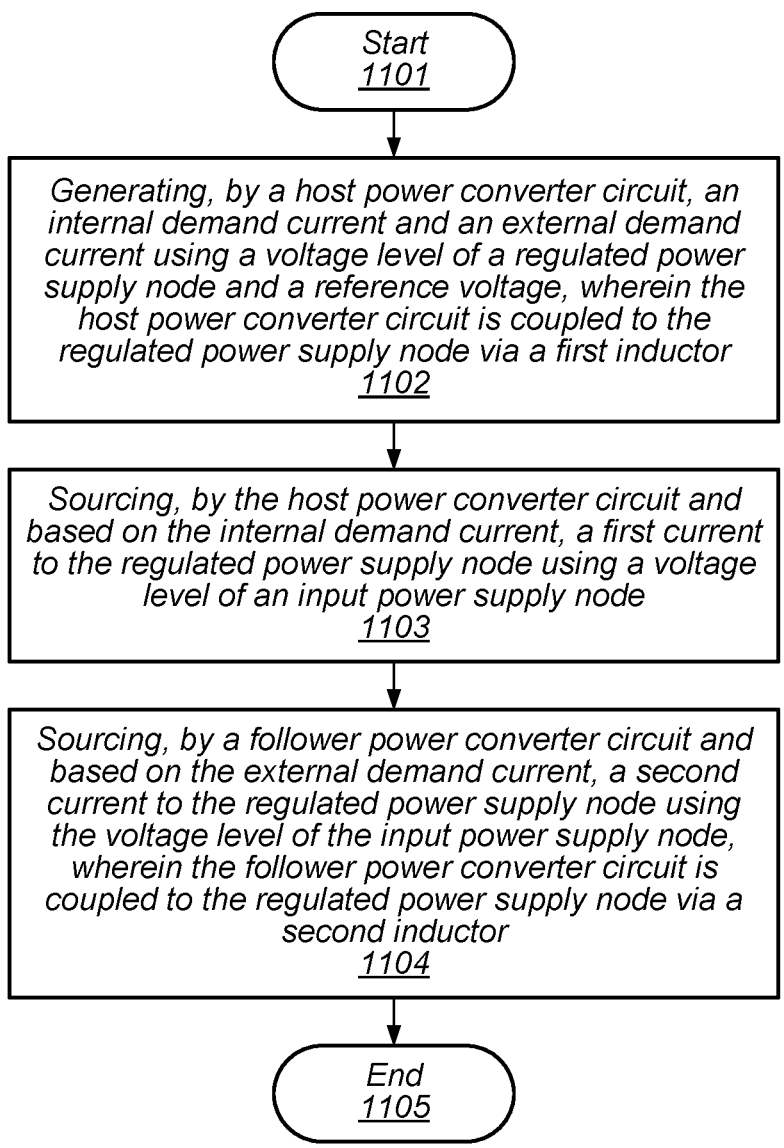
FIG. 11 illustrates a flow diagram that depicts an embodiment of a method for operating a power converter system without an initial power converter stage.

Turning to FIG. 11, a flow diagram depicting an embodiment of a method for operating a power delivery system that does not include a step-down power converter is illustrated. The method, which begins in block 1101, may be applied to various power delivery systems including power delivery system 300 as depicted in FIG. 3.

The method includes generating, by a host power converter circuit, an internal demand current and an external demand current using a voltage level of a regulated power supply node and a reference voltage (block 1102). In various embodiments, the host power converter circuit is coupled to the regulated power supply node via a first inductor.

In some embodiments, generating the external demand current and the internal demand current may include generating, by the host power converter circuit, a feedback signal using the voltage level of the regulated power supply node, and performing, by the host power converter circuit, a comparison of the feedback signal and the reference voltage. The method may further include generating, by the host power converter circuit, the external demand current and the internal demand current using a result of the comparison.

The method also includes sourcing, by the host power converter circuit and based on the internal demand current, a first current to the regulated power supply node using a voltage level of an input power supply node (block 1103).

The method further includes sourcing, by a follower power converter circuit and based on the external demand current, a second current to the regulated power supply node using the voltage level of the input power supply node (block 1104). In various embodiments, the follower power converter circuit is coupled to the regulated power supply node via a second inductor. The method concludes in block 1105.

Figure 12:
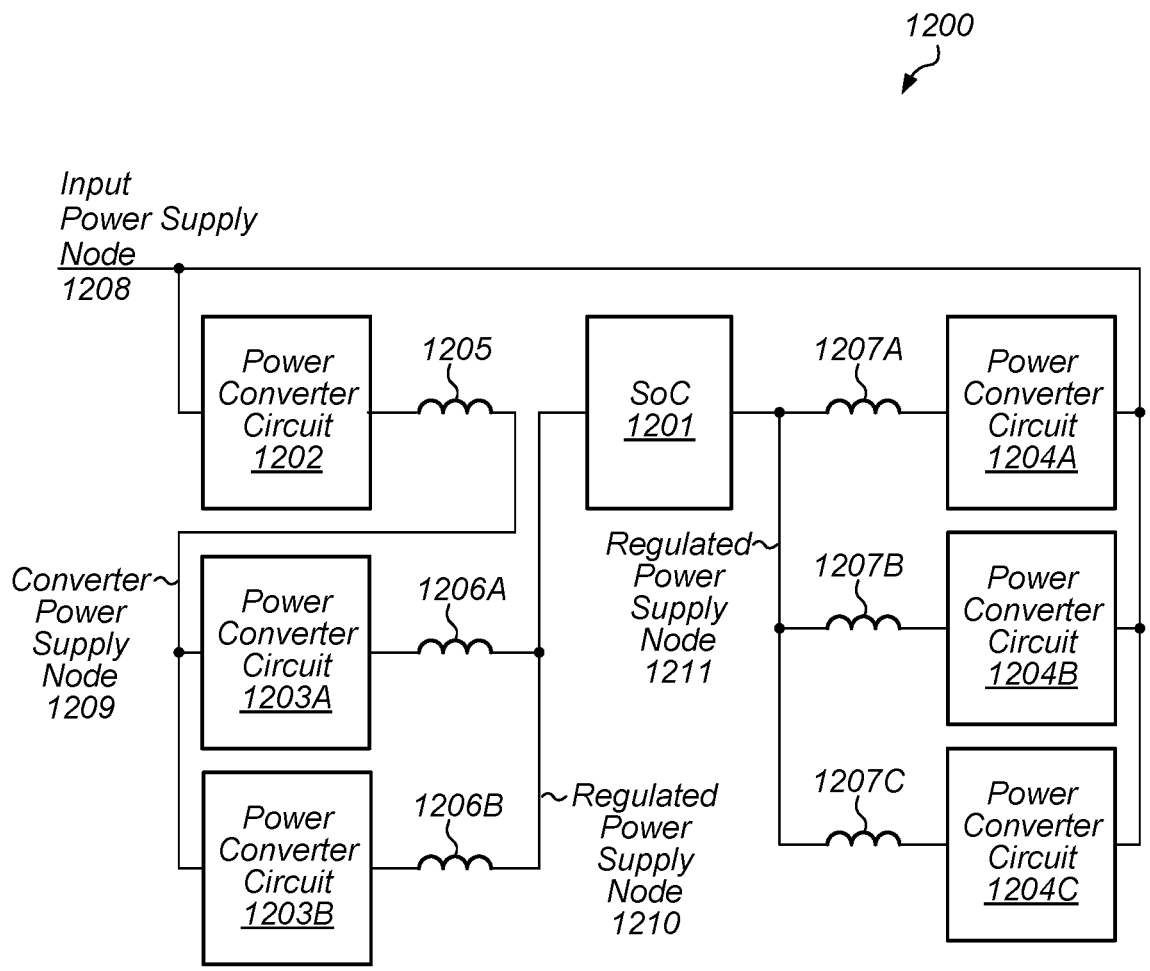
FIG. 12 illustrates a block diagram of a computer system that includes a system-on-a-chip and multiple power converter circuits.

Turning to FIG. 12, a block diagram of a computer system that includes a system-on-a-chip and multiple power converters circuits is depicted. As illustrated, computer system 1200 includes system-on-a-chip 1201 (denoted "SoC 1201"), power converter circuits 1202, 1203A-B, and 1204A-C, and inductors 1205, 1206A-B, and 1207A-C.

Power converter circuit 1202 is coupled to converter power supply node 1209 via inductor 1205, and is configured to source current to converter power supply node 1209 using a voltage level of input power supply node 1208. In various embodiments, power converter circuit 1202 may correspond to power converter circuit 101 as depicted in the embodiment of FIG. 1.

Power converter circuit 1203A and power converter circuit 1203B are coupled to regulated power supply node 1210 via inductors 1206A and 1206B, respectively. In various embodiments, power converter circuit 1203A is configured to source a particular current to regulated power supply node 1210 via inductor 1206A, and power converter circuit 1203B is configured to source a different current to regulated power supply node 1210 via inductor 1206B. In some embodiments, power converter circuit 1203A may correspond to host power converter circuit 102, while power converter circuit 1203B may correspond to follower power converter circuit 103. It is noted that although two power converter circuits are depicted as sourcing current to regulated power supply node 1210, in other embodiments, additional power converter circuits may be employed to source current to regulated power supply node 1210.

Power converter circuits 1204A-1204C are coupled to regulated power supply node 1211 via inductors 1207A-1207C, respectively. In various embodiments, power converter circuit 1204A is configured to source a particular current to regulated power supply node 1211 using the voltage level of input power supply node 1208. Additionally, power converter circuits 1204B and 1204C are configured to source respective currents to regulated power supply node 1211 using the voltage level of input power supply node 1208. In some embodiments, power converter circuit 1204A may correspond to host power converter circuit 101, while power converter circuits 1204B and 1204C may correspond to follower power converter circuit 103. It is noted that although three power converter circuits are depicted as being able to source current to regulated power supply node 1211, in other embodiments, any suitable number of power converter circuits may be employed to source current to regulated power supply node 1211.

Although SoC 1201 is depicted as have only two regulated power supply nodes, in other embodiments, SoC 1201 may include any suitable number of regulated power supply nodes. In such cases, additional power converter circuits may be employed to regulate the voltage levels on the regulated power supply nodes.

Figure 13:
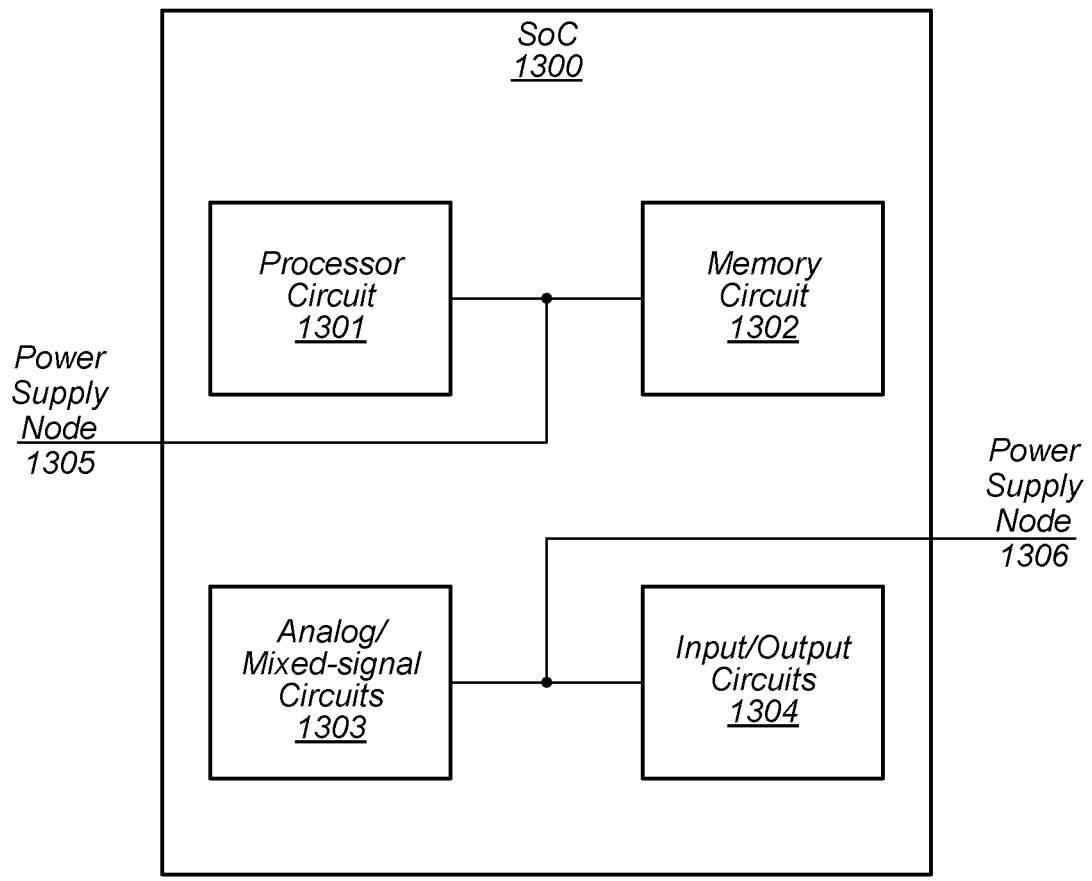
FIG. 13 is a block diagram of a system-on-a-chip.

A block diagram of a system-on-a-chip (SoC) is illustrated in FIG. 13. In the illustrated embodiment, SoC 1300 includes processor circuit 1301, memory circuit 1302, analog/mixed-signal circuits 1303, and input/output circuits 1304. Processor circuit 1301 and memory circuit 1302 are coupled to power supply node 1305, while analog/mixed-signal circuits 103 and input/output circuits 1304 are coupled to power supply node 1306. The voltage levels on power supply nodes 1305 and 1306 can be generated by different arrangements of power converter circuits such as those described above. In various embodiments, SoC 1300 may be configured for use in a desktop computer, server, or in a mobile computing application such as, e.g., a tablet, laptop computer, or wearable computing device.

Processor circuit 1301 may, in various embodiments, be representative of a general-purpose processor that performs computational operations. For example, processor circuit 1301 may be a central processing unit (CPU) such as a microprocessor, a microcontroller, an application-specific integrated circuit (ASIC), or a field-programmable gate array (FPGA).

Memory circuit 1302 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 13, in other embodiments, any suitable number of memory circuits may be employed.

Analog/mixed-signal circuits 1303 may include a crystal oscillator circuit, a phase-locked loop (PLL) circuit, an analog-to-digital converter (ADC) circuit, and a digital-to-analog converter (DAC) circuit (all not shown). In other embodiments, analog/mixed-signal circuits 1303 may be configured to perform power management tasks with the inclusion of on-chip power supplies and voltage regulators.

Input/output circuits 1304 may be configured to coordinate data transfer between SoC 1300 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1304 may be configured to implement a version of Universal Serial Bus (USB) protocol or IEEE 1394 (Firewire®) protocol.

Input/output circuits 1304 may also be configured to coordinate data transfer between SoC 1300 and one or more devices (e.g., other computing systems or integrated circuits) coupled to SoC 1300 via a network. In one embodiment, input/output circuits 1304 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1304 may be configured to implement multiple discrete network interface ports Turning now to FIG. 14, various types of systems that may include any of the circuits, devices, or systems discussed above are illustrated. System or device 1400, which may incorporate or otherwise utilize one or more of the techniques described herein, may be utilized in a wide range of areas. For example, system or device 1400 may be utilized as part of the hardware of systems such as a desktop computer 1410, laptop computer 1420, tablet computer 1430, cellular or mobile phone 1440, or television 1450 (or set-top box coupled to a television).

Similarly, disclosed elements may be utilized in a wearable device 1460, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1400 may also be used in various other contexts. For example, system or device 1400 may be utilized in the context of a server computer system, such as a dedicated server or on shared hardware that implements a cloud-based service 1470. Still further, system or device 1400 may be implemented in a wide range of specialized everyday devices, including devices 1480 commonly found in the home such as refrigerators, thermostats, security cameras, etc. The interconnection of such devices is often referred to as the "Internet of Things" (IoT). Elements may also be implemented in various modes of transportation. For example, system or device 1400 could be employed in the control systems, guidance systems, entertainment systems, etc. of various types of vehicles 1490.

Figure 14:
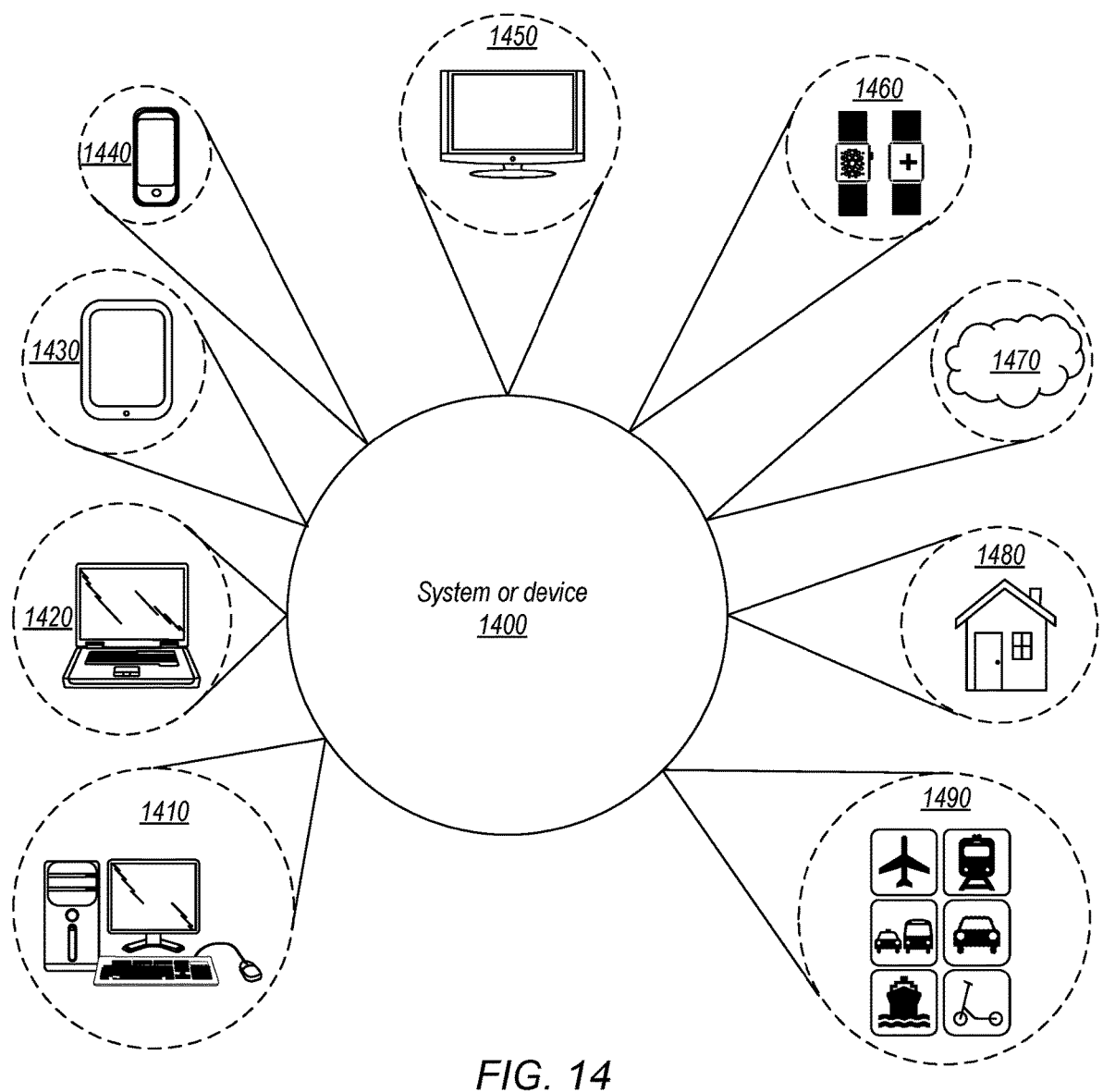
FIG. 14 is a block diagram of an embodiment of a computer system.

The applications illustrated in FIG. 14 are merely exemplary and are not intended to limit the potential future applications of disclosed systems or devices. Other example applications include, without limitation: portable gaming devices, music players, data storage devices, unmanned aerial vehicles, etc.

Figure 15:
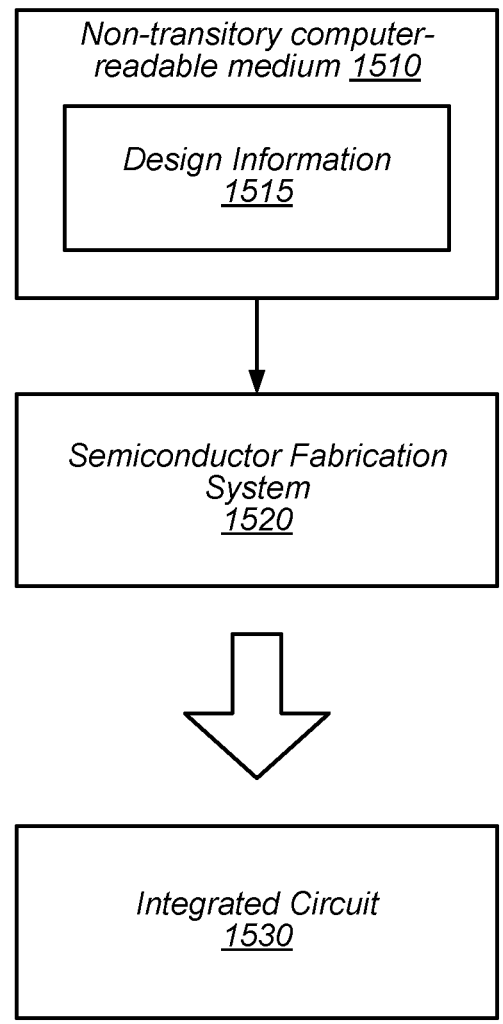
FIG. 15 illustrates an example of a non-transitory computer-readable storage medium that stores circuit design information.

FIG. 15 is a block diagram illustrating an example of a non-transitory computer-readable storage medium that stores circuit design information, according to some embodiments. In the illustrated embodiment, semiconductor fabrication system 1520 is configured to process design information 1515 stored on non-transitory computer-readable storage medium 1510 and fabricate integrated circuit 1530 based on design information 1515.

Non-transitory computer-readable storage medium 1510 may comprise any of various appropriate types of memory devices or storage devices. Non-transitory computer-readable storage medium 1510 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1510 may include other types of non-transitory memory as well or combinations thereof. Non-transitory computer-readable storage medium 1510 may include two or more memory mediums, which may reside in different locations, e.g., in different computer systems that are connected over a network.

Design information 1515 may be specified using any of various appropriate computer languages, including hardware description languages such as, without limitation: VHDL, Verilog, SystemC, SystemVerilog, RHDL, M, MyHDL, etc. Design information 1515 may be usable by semiconductor fabrication system 1520 to fabricate at least a portion of integrated circuit 1530. The format of design information 1515 may be recognized by at least one semiconductor fabrication system, such as semiconductor fabrication system 1520, for example. In some embodiments, design information 1515 may include a netlist that specifies elements of a cell library, as well as their connectivity. One or more cell libraries used during logic synthesis of circuits included in integrated circuit 1530 may also be included in design information 1515. Such cell libraries may include information indicative of device or transistor level netlists, mask design data, characterization data, and the like, of cells included in the cell library.

Integrated circuit 1530 may, in various embodiments, include one or more custom macrocells, such as memories, analog or mixed-signal circuits, and the like. In such cases, design information 1515 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1520 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1520 may also be configured to perform various testing of fabricated circuits for correct operation.

In various embodiments, integrated circuit 1530 is configured to operate according to a circuit design specified by design information 1515, which may include performing any of the functionality described herein. For example, integrated circuit 1530 may include any of the various elements shown or described herein. Further, integrated circuit 1530 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus comprising:
    a first power converter circuit configured to generate a particular voltage level on a converter power supply node based on a voltage level of an input power supply node;
    a host power converter circuit coupled to a regulated power supply node via a first inductor, wherein the host power converter circuit is configured to:
        generate an internal demand current and an external demand current using a voltage level of the regulated power supply node and a reference voltage; and
        source a first current to the regulated power supply node using a voltage level of the converter power supply node; and
    a first follower power converter circuit coupled to the regulated power supply node via a second inductor, wherein the first follower power converter circuit is configured to source a second current to the regulated power supply node using the voltage level of the converter power supply node.

2. The apparatus of claim 1, further comprising a second follower power converter circuit coupled to the regulated power supply node via a third inductor, wherein the second follower power converter circuit is configured to source a third current to the regulated power supply node using the voltage level of the input power supply node.

3. The apparatus of claim 1, wherein the host power converter circuit is further configured to generate one or more enable signals using the voltage level of the regulated power supply node and the reference voltage.

4. The apparatus of claim 3, wherein the first follower power converter circuit is further configured to source the second current to the regulated power supply node based on the one or more enable signals.

5. The apparatus of claim 3, wherein the first follower power converter circuit includes a plurality of phase circuits coupled to the regulated power supply node via a corresponding plurality of inductors, wherein a given phase circuit of the plurality of phase circuits is configured to source a portion of the second current to the regulated power supply node based on the external demand current and at least one of the one or more enable signals.

6. The apparatus of claim 1, wherein the host power converter circuit is further configured to:
generate a feedback signal using the voltage level of the regulated power supply node;
perform a comparison of the feedback signal and the reference voltage; and
generate the external demand current and the internal demand current using a result of the comparison.

7. A method, comprising:
generating, by a host power converter circuit, an internal demand current and an external demand current using a voltage level of a regulated power supply node and a reference voltage, wherein the host power converter circuit is coupled to the regulated power supply node via a first inductor;
sourcing, by the host power converter circuit and based on the internal demand current, a first current to the regulated power supply node using a voltage level of an input power supply node; and
sourcing, by a first follower power converter circuit and based on the external demand current, a second current to the regulated power supply node using the voltage level of the input power supply node, wherein the first follower power converter circuit is coupled to the regulated power supply node via a second inductor.

8. The method of claim 7, further comprising sourcing, by a second follower power converter circuit and based on the external demand current, a third current to the regulated power supply node using a voltage level of a converter power supply node, wherein the second follower power converter circuit is coupled to the regulated power supply node via a third inductor, and wherein the voltage level of the converter power supply node is less than the voltage level of the input power supply node.

9. The method of claim 8, further comprising generating, by the host power converter circuit, a plurality of enable signals using the voltage level of the regulated power supply node and the reference voltage.

10. The method of claim 9, wherein the first follower power converter circuit includes a first phase circuit coupled to the regulated power supply node via a third inductor, and a second phase circuit coupled to the regulated power supply node via a fourth inductor, and further comprising:
sourcing, by the first phase circuit in response to determining a first enable signal of the plurality of enable signals has been activated, a first portion of the second current to the regulated power supply node; and
sourcing, by the second phase circuit in response to determining a second enable signal of the plurality of enable signals has been activated, a second portion of the second current to the regulated power supply node.

11. The method of claim 10, wherein sourcing the first portion of the second current to the regulated power supply node includes:
performing a comparison of the external demand current to a sensed third inductor current;
activating a driver control signal using a result of the comparison; and
coupling a first terminal of the third inductor to the converter power supply node in response to an activation of the driver control signal, wherein a second terminal of the third inductor is coupled to the regulated power supply node.

12. The method of claim 11, further comprising:
deactivating the driver control signal in response to an activation of a clock signal; and
coupling the first terminal of the third inductor to a ground supply node in response to a deactivation of the driver control signal.

13. The method of claim 7, wherein generating the external demand current and the internal demand current includes:
generating, by the host power converter circuit, a feedback signal using the voltage level of the regulated power supply node;
performing, by the host power converter circuit, a comparison of the feedback signal and the reference voltage; and
generating, by the host power converter circuit, the external demand current and the internal demand current using a result of the comparison.

14. An apparatus, comprising:
a first power converter circuit coupled to a first regulated power supply node and a second regulated power supply node, wherein the first power converter circuit includes
one or more first phase circuits coupled to the first regulated power supply node by corresponding ones of one or more first inductors;
a plurality of second phase circuits coupled to the second regulated power supply node by corresponding ones of a second plurality of inductors;
a first error amplifier circuit configured to generate a first demand current using a first voltage level of the first regulated power supply node and a first reference voltage;
a second error amplifier circuit configured to generate a second demand current using a second voltage level of the second regulated power supply node and a second reference voltage; and
a multiplex circuit configured to select, using one or more control bits, the first demand current or the second demand current to generate a selected demand current;
wherein the one or more first phase circuits are configured to source, based on the first demand current and a voltage level of a converter power supply node, corresponding ones of one or more first currents to the first regulated power supply node; and
wherein the plurality of second phase circuits are configured to source, based on the selected demand current and the voltage level of the converter power supply node, corresponding ones of a plurality of second currents to the second regulated power supply node.

15. The apparatus of claim 14, further comprising a step-down power converter circuit configured to generate a particular voltage level on the converter power supply node using a voltage level of an input power supply node, wherein the particular voltage level is less than the voltage level of the input power supply node.

16. The apparatus of claim 14, wherein the one or more first inductors includes at least one pair of coupled inductors, wherein a particular phase circuit of the one or more first phase circuits is coupled to the first regulated power supply node via a first inductor of the at least one pair of coupled inductors, and wherein a different phase circuit of the one or more first phase circuits is coupled to the first regulated power supply node via a second inductor of the at least one pair of coupled inductors.

17. The apparatus of claim 16, further comprising:
a first feedback circuit configured to generate a first feedback signal using the first voltage level of the first regulated power supply node; and
a second feedback circuit configured to generate a second feedback signal using the second voltage level of the second regulated power supply node;
wherein to generate the first demand current, the first error amplifier circuit is further configured to compare the first feedback signal and the first reference voltage; and
wherein to generate the second demand current, the second error amplifier circuit is further configured to compare the second feedback signal and the second reference voltage.

18. The apparatus of claim 14, wherein a particular phase circuit of the one or more first phase circuits is coupled to a particular inductor of the one or more first inductors, wherein the particular phase circuit is configured to:
perform a comparison of the first demand current to a current sensed in the particular inductor;
activate a driver control signal using a result of the comparison; and
couple a first terminal of the particular inductor to the converter power supply node in response to an activation of the driver control signal, wherein a second terminal of the particular inductor is coupled to the first regulated power supply node.

19. The apparatus of claim 18, wherein the particular phase circuit is further configured to:
deactivate the driver control signal in response to an activation of a clock signal; and
couple the first terminal of the particular inductor to a ground supply node in response to a deactivation of the driver control signal.

20. The apparatus of claim 14, further comprising a memory circuit configured to store the one or more control bits.

* * * * *

UNITED STATES PATENT AND TRADEMARK OFFICE
CERTIFICATE OF CORRECTION

| | | |
|---|---|---|
| PATENT NO. | : 11,983,063 B2 | Page 1 of 1 |
| APPLICATION NO. | : 17/823949 | |
| DATED | : May 14, 2024 | |
| INVENTOR(S) | : Shawn Searles et al. | |

It is certified that error appears in the above-identified patent and that said Letters Patent is hereby corrected as shown below:

In the Drawings

Sheet 7, Fig. 7, the reference numeral for Feedback Signal 403 should be changed to reference numeral 407.

Sheet 8, Fig. 8, the reference numeral for Reference Voltage 813 should be changed to reference numeral 823.

In the Specification

Column 9, Line 40, delete "403. In various embodiments, a value of feedback signal 403" and substitute --407. In various embodiments, a value of feedback signal 407--.

Column 11, Line 28, delete "813" and substitute --823--.

Column 11, Line 31, delete "813" and substitute --823--.

Signed and Sealed this
Twenty-fourth Day of September, 2024

Katherine Kelly Vidal
*Director of the United States Patent and Trademark Office*